(12) United States Patent
Okabayashi

(10) Patent No.: US 9,210,281 B2
(45) Date of Patent: Dec. 8, 2015

(54) DISPLAY INPUT DEVICE, IMAGE FORMING APPARATUS AND METHOD OF CONTROLLING DISPLAY INPUT DEVICE, TO ENABLE AN INPUT FOR CHANGING OR ADDING A SETTING VALUE WHILE A PREVIEW IMAGE IS DISPLAYED

(71) Applicant: KYOCERA Document Solutions Inc., Osaka (JP)

(72) Inventor: Yoshifumi Okabayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/488,993

(22) Filed: Sep. 17, 2014

(65) Prior Publication Data

US 2015/0092228 A1 Apr. 2, 2015

(30) Foreign Application Priority Data

Sep. 27, 2013 (JP) ................................. 2013-201963

(51) Int. Cl.
```
G06F 3/12       (2006.01)
H04N 1/00       (2006.01)
G03G 15/00      (2006.01)
G06T 11/60      (2006.01)
G06F 3/041      (2006.01)
G06F 3/0484     (2013.01)
```
(52) U.S. Cl.
CPC ......... *H04N 1/00445* (2013.01); *G03G 15/502* (2013.01); *H04N 1/00411* (2013.01); *H04N 1/00413* (2013.01); *H04N 1/00442* (2013.01); *H04N 1/00482* (2013.01); *G06F 3/041* (2013.01); *G06F 3/04842* (2013.01); *G06T 11/60* (2013.01); *H04N 1/00461* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2007/0109580 | A1* | 5/2007 | Yoshida | 358/1.13 |
| 2008/0307329 | A1* | 12/2008 | Endoh | G03G 15/5016 715/762 |
| 2010/0290071 | A1* | 11/2010 | Okada et al. | 358/1.13 |
| 2011/0317192 | A1* | 12/2011 | Fukuoka et al. | 358/1.13 |
| 2012/0050779 | A1* | 3/2012 | Tani et al. | 358/1.13 |
| 2013/0027365 | A1* | 1/2013 | Sugimoto et al. | 345/204 |
| 2013/0235408 | A1* | 9/2013 | Yamaguchi | 358/1.13 |
| 2014/0082560 | A1* | 3/2014 | Okada | H04N 1/00411 715/835 |

FOREIGN PATENT DOCUMENTS

JP 2009-216893 A 9/2009

* cited by examiner

*Primary Examiner* — Miya J Cato
(74) *Attorney, Agent, or Firm* — Stein IP, LLC

(57) ABSTRACT

A display input device includes: a display portion in which setting item regions for a plurality of setting items are aligned and displayed, and the setting value input images including a character string indicating a setting value that can be set and a preview image indicating the result of an output of a job when a setting value that has been already set and the setting value displayed as the character string are further reflected are aligned and displayed such that a plurality of the preview images are displayed as thumbnails; and an operation input portion which receives an operation on the setting value input image as an input for setting the setting value corresponding to the selected setting value input image.

12 Claims, 12 Drawing Sheets

FIG.6
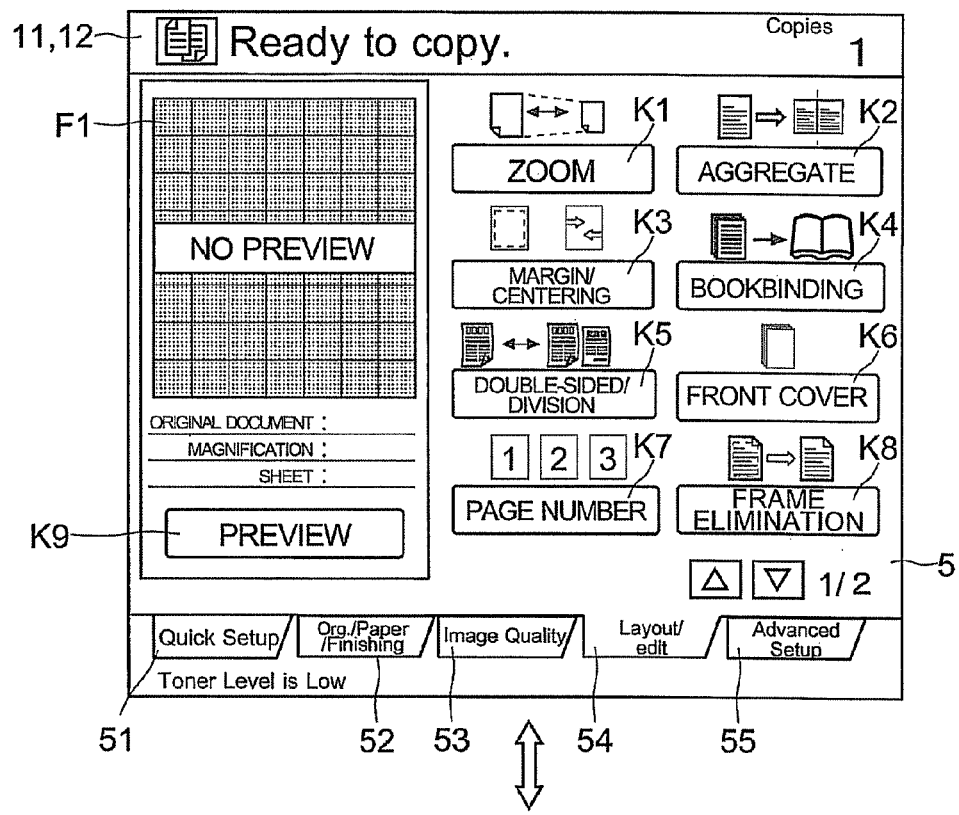
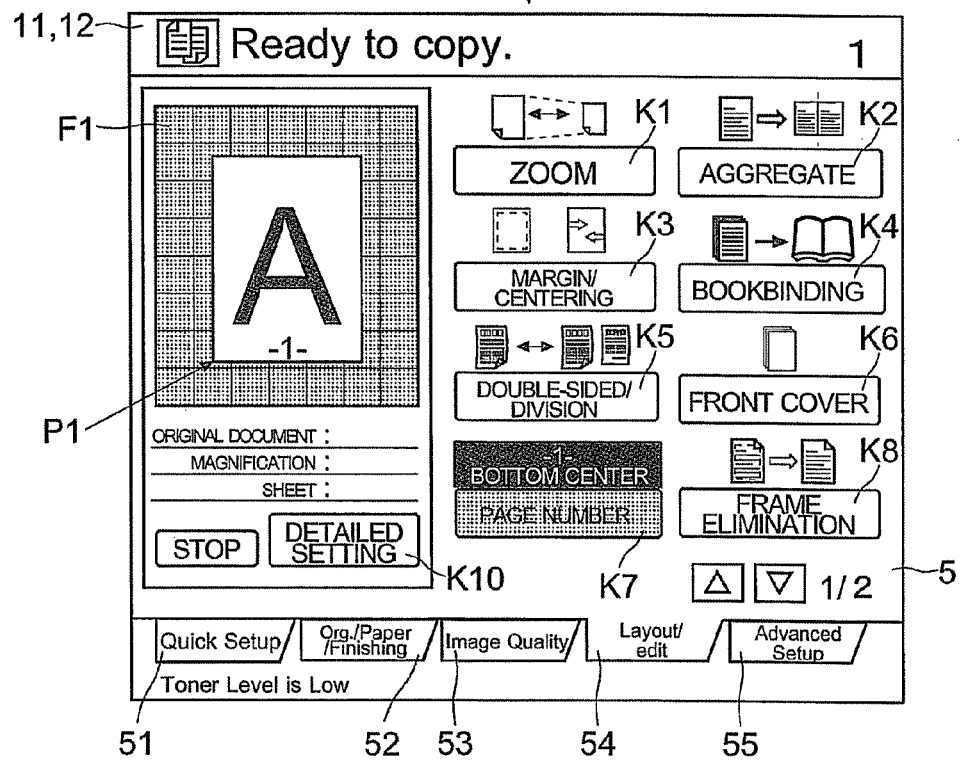

FIG.9

| FREQUENCY DATA |||||
|---|---|---|---|---|
| USER A || USER B || ... |
| SETTING ITEM | FREQUENCY (NUMBER OF TIMES) | SETTING ITEM | FREQUENCY (NUMBER OF TIMES) | ... |
| COLOR MODE | n1 | AGGREGATE | n5 | ... |
| AGGREGATE | n2 | COLOR MODE | n6 | ... |
| DENSITY | n3 | DOUBLE-SIDED PRINTING | n7 | ... |
| ZOOM (ENLARGEMENT· REDUCTION) | n4 | ZOOM (ENLARGEMENT· REDUCTION) | n8 | ... |
| ⋮ | ⋮ | ⋮ | ⋮ | ... |
| ECO-PRINT | nx1 | ECO-PRINT | nx2 | ... |
| ⋮ | ⋮ | ⋮ | ⋮ | ... |

| ASSOCIATION DATA | | D4 |
|---|---|---|
| SET SETTING VALUE | ASSOCIATED SETTING ITEM | |
| 2 in 1 | ECO-PRINT | |
| 4 in 1 | ECO-PRINT | |
| -2(DENSITY) | COLOR MODE | |
| 100%(ZOOM) | — | |
| ⋮ | ⋮ | |
| ECO-PRINT ON | AGGREGATE | |
| ⋮ | ⋮ | |

DISPLAY INPUT DEVICE, IMAGE FORMING APPARATUS AND METHOD OF CONTROLLING DISPLAY INPUT DEVICE, TO ENABLE AN INPUT FOR CHANGING OR ADDING A SETTING VALUE WHILE A PREVIEW IMAGE IS DISPLAYED

CROSS-REFERENCE TO RELATED APPLICATIONS

This application is based upon and claims the benefit of priority from the corresponding Japanese Patent Application No. 2013-201963, filed on Sep. 27, 2013, the entire contents of which are incorporated herein by reference.

BACKGROUND OF THE INVENTION

The present disclosure relates to a display input device that displays an image such as a setting key and a method of controlling such a display input device. The present disclosure also relates to an image forming apparatus that incorporates a display input device.

In an image forming apparatus such as a multifunctional peripheral or a printer, a display input device is provided that includes a display portion which displays keys for operation and setting, an image and information and a touch panel for receiving inputs for operations and settings. In order to check the details of a job or the results of an output when a job is performed, the display input device may display a preview image.

As the image forming apparatus that displays such a preview image, an image forming apparatus is known that produces an image display, that performs image formation on a sheet based on image data and that generates and displays a screen including a thumbnail image based on image data included in a job and a preview image indicating a paper ejection image based on the image data included in the job. In this way, a thumbnail image in each page included in a job and a preview image are simultaneously displayed.

For an image forming apparatus, a large number (for example, several tens to several hundreds) of setting items with which selection and setting can be performed in utilization of the individual functions (such as copying and the reading of an original document) are prepared. Hence, in the setting, an omission or an error may occur. When a setting omission or a setting error occurs in a job, the job that has been performed is useless.

A configuration may be adopted such that it is possible to check whether appropriate settings for avoiding such a waste and obtaining results corresponding to the intension of a user are made. Specifically, a preview image reflecting all setting values set by the user may be displayed before the start of a job. The user watches the preview image to check whether there is a setting omission or a setting error, and thereby can check whether or not there is a problem in an output result.

Here, when the preview image is checked, and a setting error or a setting omission is found, it is bothersome and time-consuming to reset the setting values in a conventional manner. Specifically, when the resetting is performed, it is bothersome and time-consuming to perform operations as follows: (1) the interruption of the display of the preview image→(2) the change to the selection screen of a setting item that is desired to be set→(3) the selection of the setting item and the setting of a setting value on a setting screen displayed→(4) the redisplay of a preview image reflecting the setting value that has been reset. Furthermore, when a setting error or a setting omission is found again, the above items (1) to (4) are repeated. As described above, when a preview image is displayed, it disadvantageously takes much time to complete the setting.

Conventionally, in a display input device, only one sheet of a preview image is displayed. Conventionally, only a preview image reflecting all setting values that have been set is displayed. Since in an operation of selecting a setting item and setting a setting value, no preview image is displayed, it is difficult to find, during the setting operation, whether the selection of the setting item (function) and the setting of the setting value are being performed according to the intension. In other words, it is disadvantageously difficult to expect what results are produced by a job through setting of the setting value and the meaning and the effect of the setting item and the setting value. In particular, it is difficult to recall it when a first-time setting item or an unfamiliar setting item is used.

In the technology described above, a thumbnail image of a plurality of pages included in a job and one sheet of a preview image are only displayed simultaneously. The thumbnail image indicates only the details of the page. In order to change the setting value for the setting item (function), it is necessary to interrupt the display of the preview image, to perform, again, the selection of a setting item and the setting of a setting value and to display a preview image again. Hence, in the technology described above, it is impossible to solve the above problem in the display of the preview image.

SUMMARY OF THE INVENTION

A display input device according to a first aspect of the present disclosure includes a display portion (display panel) and an operation input portion. The display portion aligns and displays setting item regions including setting item names for a plurality of setting items. The display portion aligns and displays setting value input images within the setting item region. The setting value input image includes a character string indicating a setting value and a preview image indicating the result of an output of a job when a setting value that has been already set and the setting value displayed as the character string are combined. The display portion aligns and displays the setting value input images such that a plurality of the preview images are displayed as thumbnails. The operation input portion receives an operation on the setting value input image as an input for setting the setting value corresponding to the selected setting value input image.

Further features and advantages of the present disclosure will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is a diagram showing examples of selection screens in a state where a user does not particularly set a setting value and in a state where a user sets a setting value in the display input device according to the embodiment;

FIG. 9 is a diagram showing an example of frequency data according to the embodiment;

FIG. 13 shows an example of association data according to the embodiment.

DETAILED DESCRIPTION OF THE EMBODIMENTS

An embodiment will be described below with reference to FIGS. 1 to 13. A description will be given below using, as an example, a multifunctional peripheral 100 (that corresponds to an image forming apparatus) including a display input device 1. The individual elements such as configurations and arrangements described in the present embodiment do not limit the scope of the disclosure, and are simply illustrative.

(Outline of an Image Forming Apparatus)

Figure 1:
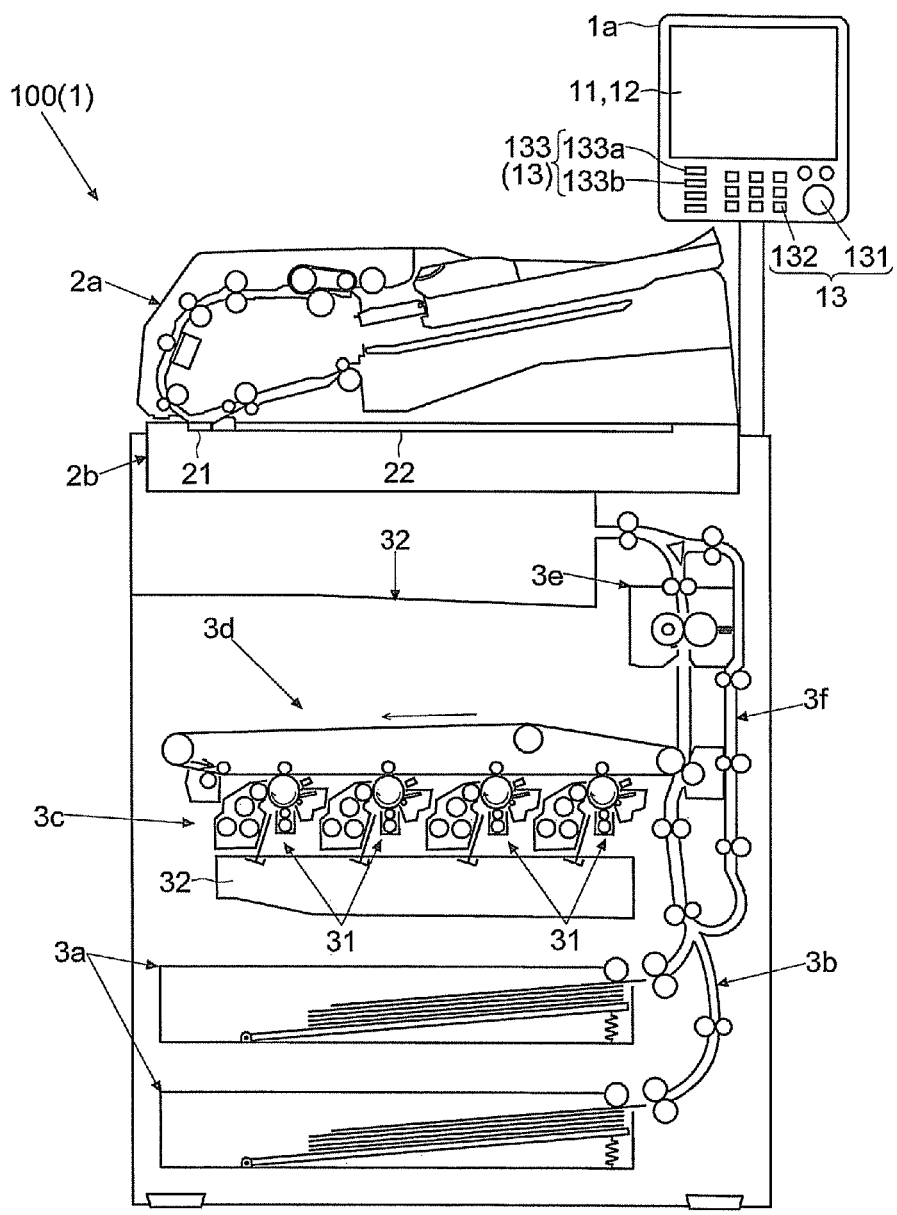
FIG. 1 is a diagram showing an example of a multifunctional peripheral according to an embodiment.

The outline of the multifunctional peripheral 100 according to the embodiment will first be described with reference to FIG. 1. FIG. 1 is a diagram showing an example of the multifunctional peripheral 100 according to the embodiment.

As shown in FIG. 1, in an upper right portion of the multifunctional peripheral 100, an operation panel 1a for making various types of settings on the multifunctional peripheral 100 is provided (the details of which will be described later). As shown in FIG. 1, in an upper portion of the multifunctional peripheral 100 according to the present embodiment, an original document transport portion 2a and an image reading portion 2b are provided. The multifunctional peripheral 100 includes, therewithin, a paper feed portion 3a, a transport portion 3b, an image formation portion 3c, an intermediate transfer portion 3d, a fixing portion 3e and a double-sided transport portion 3f.

The image reading portion 2b reads an original document to generate image data. In other words, the image reading portion 2b functions as a portion that inputs the image data. The original document transport portion 2a automatically and continuously transports original documents which are set, one by one, to the reading position (feed reading contact glass 21) of the image reading portion 2b. The image reading portion 2b reads the original document transported by the original document transport portion 2a and the original document placed on a placement reading contact glass 22 below the original document transport portion 2a.

In printing, the paper feed portion 3a feeds sheets to the transport portion 3b one by one. The transport portion 3b transports the sheet to an ejection tray 32. The image formation portion 3c forms a toner image based on the image data. The image formation portion 3c includes: image formation units 31 that include a photosensitive drum, a charging device and a development device; and an exposure unit 32. A plurality of image formation units 31 are provided, and each of them forms a toner image of a different color. The intermediate transfer portion 3d receives the primary transfer of the toner image formed in each of the image formation units 31, and secondarily transfers it to the sheet. The fixing portion 3e fixes the toner image transferred to the sheet. The sheet (printed sheet) to which the toner has been fixed is ejected to the ejection tray 32. In double-sided printing, the double-sided transport portion 3f transports the sheet whose one side has been printed to the upstream side of the image formation portion 3c.

(Operation Panel 2a)

The operation panel 1a serving as the display input device 1 according to the embodiment will then be described with reference to FIG. 1.

As shown in FIG. 1, the operation panel 10 is provided in an upper portion of the front surface of the multifunctional peripheral 100. The operation panel 1a includes a display portion 11, a touch panel portion 12 (that corresponds to an operation input portion) and various types of hard keys 13 (that correspond to the operation input portion). The operation panel 1a includes, as the hard keys 13, a start key 131 for providing an instruction to start processing such as copying and a numeric keypad portion 132 for the input of figures.

The display portion 11 is a liquid crystal display panel. The display portion 11 may be another type of display panel such as an organic EL panel. The display portion 11 displays a screen or an image on which a menu and keys for the setting of the multifunctional peripheral 100 are arranged. The user performs operations on keys displayed on the display portion 11, and thereby can input various types of settings on the multifunctional peripheral 100. The display portion 11 displays various types of images or screens such as messages like the states of the multifunctional peripheral 100 and the like.

The touch panel portion 12 is provided on (the upper surface of) the display portion 11. The touch panel portion 12 is a portion for detecting a position and coordinates touched by the user. The position where the key is displayed and the position touched are compared, and thus the key specified by the user is identified, and the input from the user is received. The touch panel portion 12 of the present embodiment can detect a plurality of points that are touched. For example, a capacitive touch pad is adopted.

On the operation panel 1a, a plurality of function selection keys 133 are provided. The user presses any one of the function selection keys 133 to select a function to be used from functions of the multifunctional peripheral 100. The function selection keys 133 include a copy key 133a that is pressed when a copy function is used and a transmission key 133b that is pressed when the image data based on the reading of the image reading portion 2b is transmitted to a computer 200 or a facsimile device 300. Then, the display portion 11 display a selection screen 5 for selecting a setting item on the selected function (the pressed function selection key 133) (details of which will be described later).

(Hardware Configuration of the Multifunctional Peripheral 100 and the Like)

Figure 2:
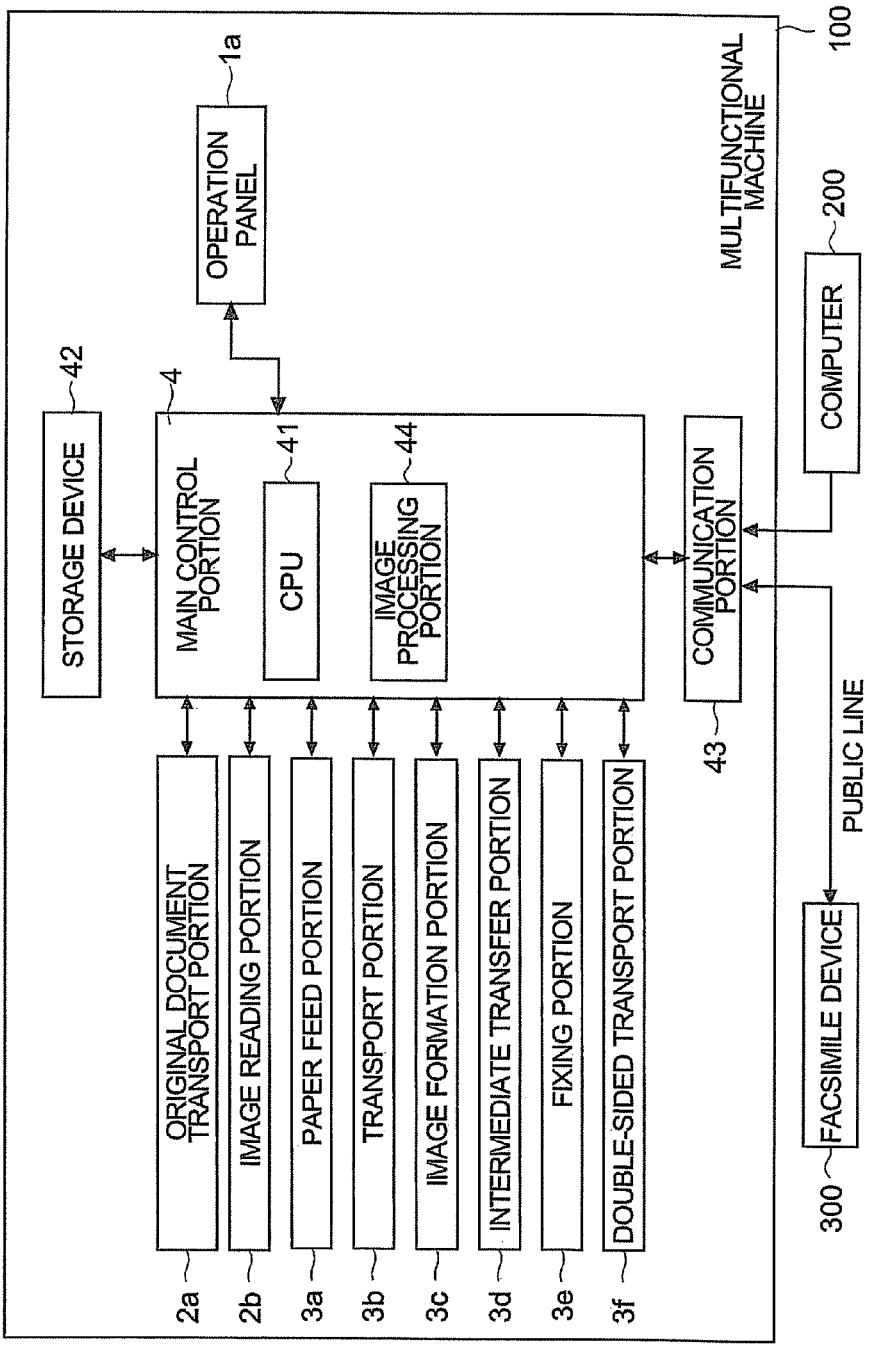
FIG. 2 is a diagram showing an example of a hardware configuration of the multifunctional peripheral and an operation panel according to the embodiment.

An example of the hardware configuration of the multifunctional peripheral 100 and the operation panel 1a according to the embodiment will then be described with reference to FIG. 2. FIG. 2 is a diagram showing the example of the hardware configuration of the multifunctional peripheral 100 and the operation panel 1a.

A main control portion 4 is provided within the main body of the multifunctional peripheral 100. The main control portion 4 is connected to the operation panel 1a, the original document transport portion 2a, the image reading portion 2b, the paper feed portion 3a, the transport portion 3b, the image formation portion 3c, the intermediate transfer portion 3d, the fixing portion 3e, the double-sided transport portion 3f and the like, and controls the operations of these portions.

The main control portion 4 includes elements and a circuit that control a CPU 41 and the like. The CPU 41 performs an operation and the like based on a control program and control data stored in a storage device 42, and thereby controls the individual portions of the multifunctional peripheral 100. The storage device 42 is connected to the main control portion 4. The storage device 42 is a combination of nonvolatile and volatile devices such as a ROM, a RAM and a HDD. The storage device 42 can store various types of data such as a program for controlling the multifunctional peripheral 100, control data, setting data and image data.

The main control portion 4 is connected to a communication portion 43. The communication portion 43 is connected through a network, a public line or the like, to the computer 200 and the facsimile device 300 (only one of each of which is shown in FIG. 2 for convenience). The main control portion 4 can transmit, through the communication portion 43, various types of data such as image data to the external computer 200 and the facsimile device 300 at the other end (a scanner function and a facsimile transmission function). The main control portion 4 can also perform printing based on image data transmitted from the external computer 200 and the facsimile device 300 at the other end and input to the multifunctional peripheral 100 (a printer function and a facsimile reception function).

The main control portion 4 includes an image processing portion 44. The image processing portion 44 performs image processing on the image data (input image data D5; see FIG. 3) obtained by reading the original document and the image data (input image data D5; see FIG. 3) input through the communication portion 43 to the multifunctional peripheral 100. The image data processed by the image processing portion 44 is used for printing or transmission or is stored in the storage device 42.

Before the execution of a job for printing or transmission, the display portion 11 can display a preview image that is an image for checking whether or not a setting is appropriate and that reflects a setting value set on the operation panel 1a. Then, the image processing portion 44 generates image data (preview image display data D6; see FIG. 3) necessary for display of this preview image. The main control portion 4 recognizes an input performed on the operation panel 1a, and controls the multifunctional peripheral 100 such that a job for copying, reading the original document, transmission or the like is performed according to the setting by the user.

(Configuration of the Display Input Device 1)

Figure 3:
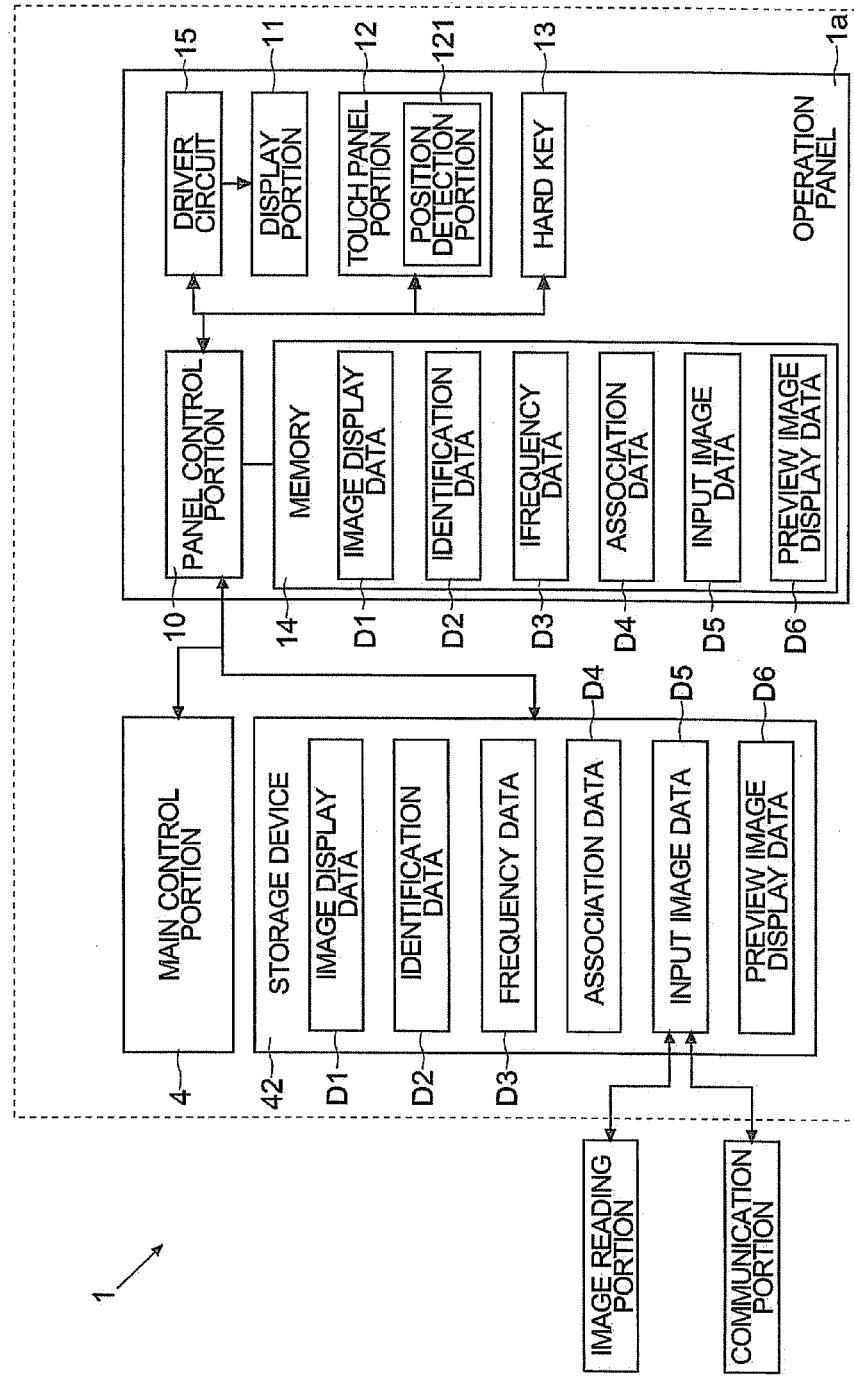
FIG. 3 is a diagram for illustrating a display input device according to the embodiment.

An example of the display input device 1 according to the embodiment will then be described with reference to FIG. 3. FIG. 3 is a diagram for illustrating the display input device 1 according to the embodiment.

The display input device 1 includes the operation panel 1a. The operation panel 1a is a main portion of the display input device 1. The storage device 42 and the main control portion 4 of the main body can be used as part of the display input device 1. As described above, the multifunctional peripheral 100 includes the display input device 1.

The operation panel 1a includes a panel control portion 10, the display portion 11, the touch panel portion 12, the hard keys 13 (for example, the numeric keypad portion 132 and the start key 131), a memory 14 (that corresponds to a storage portion) and a driver circuit 15.

The panel control portion 10 includes a CPU and an IC. The panel control portion 10 controls the display of the display portion 11. The main control portion 4 transmits data necessary for display to the panel control portion 10. The panel control portion 10 references, based on an instruction from the main control portion 4, information stored in the memory 14, which stores, for example, programs for display and operation control. The panel control portion 10 provides an instruction of information to be displayed to the driver circuit 15, which actually controls the display of the panel of the display portion 11.

The panel control portion 10 receives the output of the touch panel portion 12, and detects and recognizes the touched position (coordinates). In order to perform the position detection, in the touch panel portion 12, a position detection portion 121 is provided. The position detection portion 121 is an IC for detecting a touch position (the coordinates of the touched point). The panel control portion 10 recognizes the touch position based on the output of the touch panel portion 12 (the position detection portion 121). Then, the panel control portion 10 compares the touch position with image data on a screen displayed by the display portion 11 when the touch position is touched, and thereby recognizes a key or a button displayed in the touch position. Data such as a table indicating the correspondence between the output and the position (coordinates) of the touch panel portion 12 is stored in the memory 14. The memory 14 includes a ROM and a RAM. As described above, the panel control portion 10 can recognize the key operated by the user.

The memory 14 stores image display data D1, identification data D2, frequency data D3, association data D4, input image data D5, preview image display data D6 and the like. These pieces of data may be stored in the storage device 42. When they are stored in the storage device 42, the panel control portion 10 makes the storage device 42 transmit necessary data, and receives the transmitted data.

The image display data D1 is image data, text data and the like for displaying a screen (selection screen 5) for selecting a setting item provided for each function such as copying or transmission and a screen (setting value setting screen) for setting a setting value for the selected setting item. The panel control portion 10 reads, from the image display data D1, data necessary for displaying a screen to be displayed according to an operation performed on the operation panel 1a, and makes the display portion 11 display a screen or an image based on the read data.

(Display of the Preview Image)

The display of the preview image on the operation panel 1a (the display input device 1) according to the embodiment will then be described with reference to FIG. 3.

In the display input device 1 according to the present embodiment, the preview image can be displayed on the display portion 11. The preview image is an image that indicates the result of the execution of a job. In the display input device 1 according to the present embodiment, various preview images are displayed (details of which will be described later).

The preview image is generated based on the input image data D5 that is image data obtained by reading the original document or the input image data D5 that is received by the communication portion 43. As shown in FIG. 3, the image data obtained by reading the original document and the image data that is received by the communication portion 43 are stored in the storage device 42. The memory 14 of the operation panel 1a may store the input image data D5.

Then, when a preview image is displayed, the image processing portion 44 generates the preview image display data D6 (image data displayed as the preview image). For example, the image processing portion 44 performs, according to the setting of the user (reflecting the setting value that is set), image processing on the input image data D5 that is subjected to preview display. In general, the number of pixels in a region of the display portion 11 where the preview is displayed is less than the number of pixels on the input image data D5 after the image processing. Hence, the image processing portion 44 generates the preview image display data D6 based on an algorithm for reducing the number of pixels. The preview image display data D6 may be generated by the panel control portion 10 of the operation panel 1a. The panel control portion 10 displays, based on the preview image display data D6, various types of preview images on the display portion 11.

(Identification of the User)

Figures 4, 5:
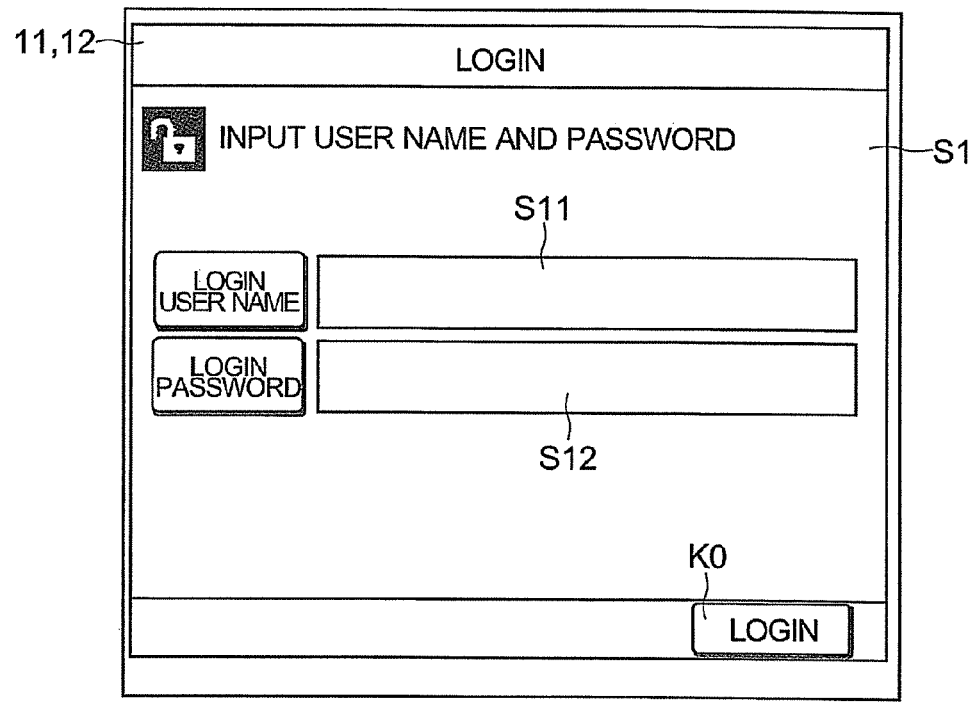
FIG. 4 is a diagram showing a login screen in the display input device according to the embodiment.
FIG. 5 is a diagram showing an example of identification data in the display input device according to the embodiment.

The identification of the user will then be described with reference to FIGS. 3 to 5. FIG. 4 is a diagram showing a login screen S1. FIG. 5 is a diagram showing an example of the identification data D2.

As shown in FIG. 3, first, the memory 14 and the storage device 42 (either of them may store) stores the identification data D2 for identifying the user. The identification data D2 is data for determining whether or not the user who has an authority to utilize the multifunctional peripheral 100 (display input device 1) (for determining whether or not to identify the login).

As shown in FIG. 5, in the identification data D2, the names of users to whom a usage authority is given and login user names and login passwords for the individual users are specified. The login user name and the login password are information necessary for the login, and an administrator or the like allocates it to each user. Items such as access levels, departments, mail addresses and network addresses may be also associated with the individual users and stored.

It is possible to perform change and addition on the users, the login user names and the login passwords by producing inputs on the operation panel 1a (touch panel portion 12). The identification data D2 that is produced by the computer 200 or the like is transmitted, and the identification data D2 that is received by the communication portion 43 may be stored in the memory 14 or the storage device 42.

The operation panel 1a (the multifunctional peripheral 100) is brought into a logout state when a predetermined time has elapsed without an operation since the last operation of the operation panel 1a or since the completion of a job (automatic logout). The operation panel 1a is also brought into a logout state when a logout key (not shown) provided in the operation panel 1a is pressed.

In the logout state, the panel control portion 10 does not display, on the display portion 11, the screen for selecting the setting item and the setting value setting screen for setting the setting value within the selected setting item. Hence, in the logout state, although an input for receiving identification is received, it is impossible to make settings on jobs for copying and transmission and the system of the multifunctional peripheral 100.

In the logout state, the panel control portion 10 displays, on the display portion 11, the login screen S1 shown in FIG. 4. A user who wants to use the multifunctional peripheral 100 (the display input device 1) inputs the login user name and the login password allocated to the user. In other words, the operation input portion (the touch panel portion 12 and the hard keys 13) receives the identification input for identifying the user. When on the screen shown in FIG. 4, the display position of a login user name display column S11 or a login password display column S12 is touched, the panel control portion 10 displays a character input software keyboard (not shown) on the display portion 11. By utilizing this character input software keyboard, the login user name and the login password are input.

Then, when the display position of a login key K0 is touched, the panel control portion 10 compares a combination of the login user name and the login password that are input with the identification data D2, and thereby recognizes the matching user. When the matching combination of the login user name and the login password is not present within the identification data D2, the panel control portion 10 determines that the identification is unsuccessful. In this case, the login is not identified, and the login screen S1 remains displayed.

When the matching combination of the login user name and the login password is present, the login is identified. In this case, the panel control portion 10 displays the selection screen 5 of the setting item, the setting value setting screen or the like. The identification of the user may be performed by the main control portion 4. In this case, the main control portion 4 notifies the panel control portion 10 of information on whether or not the identification is achieved and, when the identification is achieved, the main control portion 4 notifies the panel control portion 10 of the identified user.

(Selection of a Setting Item and the Setting of a Setting Value)

The selection of a setting item and the setting of a setting value in the selected setting item in the operation panel 1a according to the embodiment will then be described with reference to FIG. 6. FIG. 6 is a diagram showing examples of the selection screens 5 in a state where a user does not particularly set a setting value and in a state where a user sets a setting value in the display input device 1 according to the embodiment.

In the operation panel 1a (the multifunctional peripheral 100) according to the present embodiment, in the login state, it is possible to select, with the function selection keys 133, a function to be used, such as the copying function or the transmission function. The multifunctional peripheral 100 has other functions such as a printer function for performing printing based on image data and setting data transmitted from the computer 200 and a box function capable of storing and reutilizing image data obtained by reading.

A description will be given below using, an example, the selection of a setting item and the setting of a setting value in the selected setting item when the copying function is used. The copying function is the function of reading the original document and performing, based on image data obtained by the reading, printing to copy the original document. For the copying function, a plurality of setting items are prepared. For the other functions such as the transmission function, a plurality of setting items are prepared.

When the copy key 133a of the function selection keys 133 is pressed, the display portion 11 displays the selection screen 5 for selecting the setting items on the copying function. Since a large number of setting items that are previously prepared and that can be selected are present, all keys (setting item selection keys) for selecting the setting items cannot be displayed within one screen. Hence, each of the setting items is previously classified into any one or two or more of a plurality of categories (tabs).

Then, the panel control portion 10 displays, within each of the selection screens 5, as tabs, on the display portion 11, a quick setup tab 51, an original document/sheet/finishing tab 52, an image quality tab 53, a layout/edit tab 54 and an advanced setting tab 55.

When any one of the tabs 51 to 55 is touched, the panel control portion 10 displays, on the display portion 11, the selection screen 5 for selecting the setting items (setting items that are previously classified so as to belong to the category of the touched tab) associated with the touched tab. In other words, the selection screen 5 to be displayed is changed depending on the touched tab. Then, within the selection screen 5, the selection keys for selecting the setting item are displayed as a list.

FIG. 6 shows an example of the selection screen 5 that is displayed when the display position of the layout edit tab 54 is touched. In the quick setup tab 51, the selection screen 5 on which keys corresponding to the setting item previously selected by the user are arranged is displayed. When the original document/sheet/finishing tab 52 is touched, the selection screen 5 is displayed that is used for selecting the setting items on the original document and the sheet, such as the size of the original document and the size of the sheet, the orientation of the original document and the she and a paper feed source. When the image quality tab 53 is touched, the selection screen 5 is displayed that is used for selecting the setting items on the image quality, such the density of a printed item. When the advanced setting tab 55 is touched, the selection screen 5 is displayed that is used for selecting the setting items which are not classified into the tabs 51 to 55. The illustration and description of the selection screens 5 corresponding to the tabs other than the layout edit tab 54 are omitted.

On the selection screen 5 corresponding to the layout edit tab 54, keys (setting item selection keys) for selecting the setting items on the arrangement of each page and the edition of the details of the printed item in copying are arranged. Specifically, on the selection screen 5 corresponding to the layout edit tab 54, a plurality of setting item selection keys are arranged such as a zoom key K1 for selecting a setting item on magnification, an aggregate key K2 for selecting a setting item on aggregate printing, a margin centering key K3 for selecting a setting item on margin setting and centering, a bookbinding key K4 for selecting a setting item on bookbinding printing, a double-sided division key K5 for selecting a setting item on double-sided printing, a front cover key K6 for selecting a setting item on a front cover, a page number insertion key K7 for selecting a setting item on page number insertion and a frame elimination key K8 for selecting a setting item on frame elimination printing.

The display position of the setting item selection key displayed on the selection screen 5 is touched, and thus it is possible to select the setting item. When the display position of the setting item selection key is touched, the panel control portion 10 displays, on the display portion 11, a setting value setting screen (not shown) for setting a setting value on the selected setting item. The image data (the image display data D1; see FIG. 3) necessary for displaying the selection screen 5 and the setting value setting screen is stored in the memory 14. The panel control portion 10 uses the image display data D1 within the memory 14 to display, on the display portion 11, the selection screen 5 according to an operation on the tab and to display, on the display portion 11, the setting value setting screen according to an operation on the setting item selection key.

For example, on a setting screen displayed when the display position of the zoom key K1 is touched, a magnification (ratio of a copied item to the original document) in copying can be set as a setting value. For example, on a setting screen displayed when the display position of the page number insertion key K7 is touched, whether or not to provide a page number on the printed item, in which position the page number is provided in the printed item when the printed number is provided and the like can be set as setting values. Although the setting value setting screen is prepared for each of the other keys, the details thereof will be omitted.

As described above, the panel control portion 10 displays a plurality of tabs on the display portion 11, and when the touch panel portion 12 detects the touch of the display position of a tab, the panel control portion 10 displays, on the display portion 11, the setting item selection keys for selecting the setting items classified with reference to the tab. Then, the panel control portion 10 recognizes and receives an operation of setting the setting value on the setting value setting screen displayed by selecting setting item with the setting item selection key based on the output of the touch panel portion 12 or the output of the hard keys 13.

Then, as shown in FIG. 6, the panel control portion 10 displays, on the display portion 11, designs or icons indicating the details of setting items on the setting item selection keys of the setting items for which setting values have not been set. On the other hand, for the setting item for which the setting value has been set, the panel control portion 10 displays, on the display portion 11, the setting value which has been set, instead of the design. As described above, the form of display on the display column of the setting value differs depending on whether or not the setting operation is performed. For example, the form of display can be changed such as by black-and-white reversal or changing the display color of the setting item selection key. The lower diagram of FIG. 6 shows an example where the user selects the setting item of the page number insertion and sets a setting value for insertion of a page number in the bottom center.

(Display of an All-Setting Value Preview Image P1)

Figure 7:
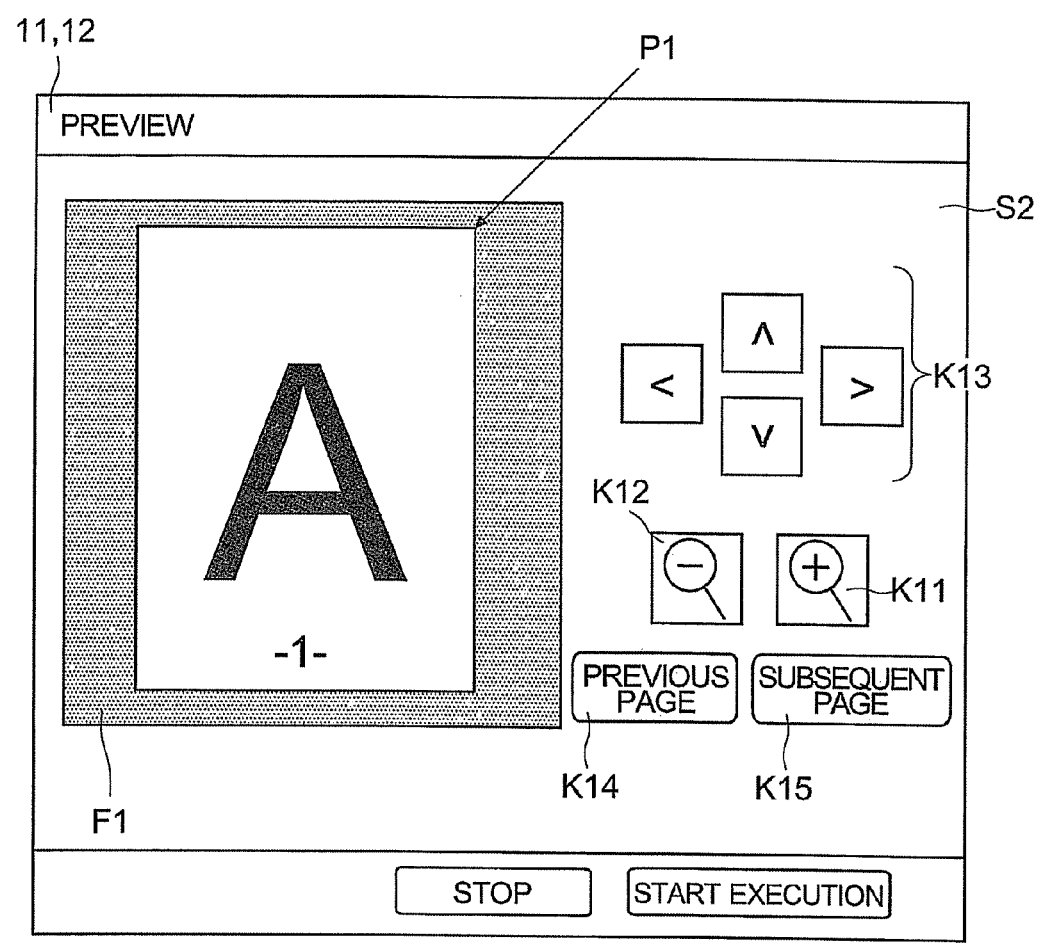
FIG. 7 is a diagram for illustrating the detailed display mode of a preview image on the operation panel according to the embodiment.

The display of an all-setting value preview image P1 on the operation panel 1a according to the embodiment will then be described with reference to FIGS. 6 and 7. FIG. 7 is a diagram for illustrating the detailed display mode of the preview image on the operation panel 1a according to the embodiment.

The all-setting value preview image P1 is a preview image that reflects all setting values set by the user.

A predetermined default setting value is applied to the setting item that is not selected by the user. For example, for the setting items, such as the page number insertion, the aggregate printing and the centering, on which whether or not the setting item (function) is utilized can be determined, the default setting value is set at a value indicating "it is not used (it is not performed)". On the other hand, for the setting items, such as the magnification and the density, on which a determination cannot be simply made by yes or no (on or off) (whether or not the setting item is utilized cannot be determined) and for which it is necessary to set a specific value, the default setting value is set at a value that is determined to be used most frequently on an empirical basis (for example, the "same magnification" for the setting item on zoom, and the "standard" for the density). Data (default setting value data) indicating the default setting values of the individual setting items is stored in the memory 14 (may be stored in the storage device 42).

On each of the selection screens 5 for selecting the setting item, as shown in each of the upper and lower diagrams of FIG. 6, a preview image display region F1 is provided. In order for the all-setting value preview image P1 to be displayed, the display position of a preview key K9 (see the upper diagram of FIG. 6) provided on the selection screen 5 is touched.

Here, in the display input device 1 of the present embodiment, the preview image is displayed based on the input image data D5 (the image data obtained by reading the original document and the image data received by the communication portion 43).

Hence, when the touch panel portion 12 recognizes the touch of the display position of the preview key K9, and detects that based on a sensor (not shown) for detecting the setting of the original document on the original document transport portion 2a, the original document is set on the original document transport portion 2a, the main control portion 4 makes the original document transport portion 2a continuously transport all the pages of the original document, and makes the image reading portion 2b read all the pages of the transported original document (part of the pages instead of all the pages may be read). On the other hand, when it cannot be detected that the original document is set on the original document transport portion 2a, the main control portion 4 makes the image reading portion 2b read the original document placed on the placement reading contact glass 22 (see FIG. 1). Then, the image reading portion 2b generates image data on the original document, and the storage device 42 stores the generated image data. When printing or transmission is performed based on only the image data stored in the storage device 42, it is not necessary to read the original document, and the image data is read from the storage device 42.

Then, the image processing portion 44 (which may be the panel control portion 10) performs, on the input image data D5, image processing corresponding to the current setting value, and generates, based on the image data on which the image processing has been performed, the preview image display data D6 of the all-setting value preview image P1 (the image data of the all-setting value preview image P1). Then, the main control portion 4 displays, based on the generated preview image display data D6, the all-setting value preview image P1 on the display portion 11.

The lower diagram of FIG. 6 illustrates the all-setting value preview image P1 that is displayed by an operation on the preview key K9 in a state where in the setting item of the page number insertion, a setting value for providing the page number in the bottom center is set.

Here, the display input device 1 of the present embodiment includes the detailed display mode in which the all-setting value preview image P1 is enlarged and displayed so that the all-setting value preview image P1 can be checked more precisely. In order for the detailed display mode to be entered, the display position of a detailed setting key K10 that is displayed instead of the preview key K9 according to the display of the all-setting value preview image P1 is touched.

When the display position of the detailed setting key K10 is touched, the panel control portion 10 displays, on the display portion 11, a detailed preview screen S2 as shown in FIG. 7. On the detailed preview screen S2, the all-setting value preview image P1 is displayed such that the all-setting value preview image P1 is larger than the selection screen 5. Moreover, the following keys are arranged: an enlargement key K11 for enlarging and displaying the all-setting value preview image P1, a reduction key K12 for producing reduced display and four movement keys K13 for moving the display position in the all-setting value preview image P1 at the time of enlarged display.

Moreover, a previous page key K14 and a subsequent page key K15 for displaying pages different from the all-setting value preview image P1 being currently displayed are arranged. When the displayed page is switched, the image processing portion 44 or the panel control portion 10 performs, on the input image data D5 on a page to which the page is switched, image processing corresponding to the setting value that is set, and generates the preview image display data D6 based on the image data on which the image processing has been performed. In this way, whatever page is displayed, the display portion 11 displays the all-setting value preview image P1 reflecting the setting value being set.

(Thumbnail Display)

Figure 8:
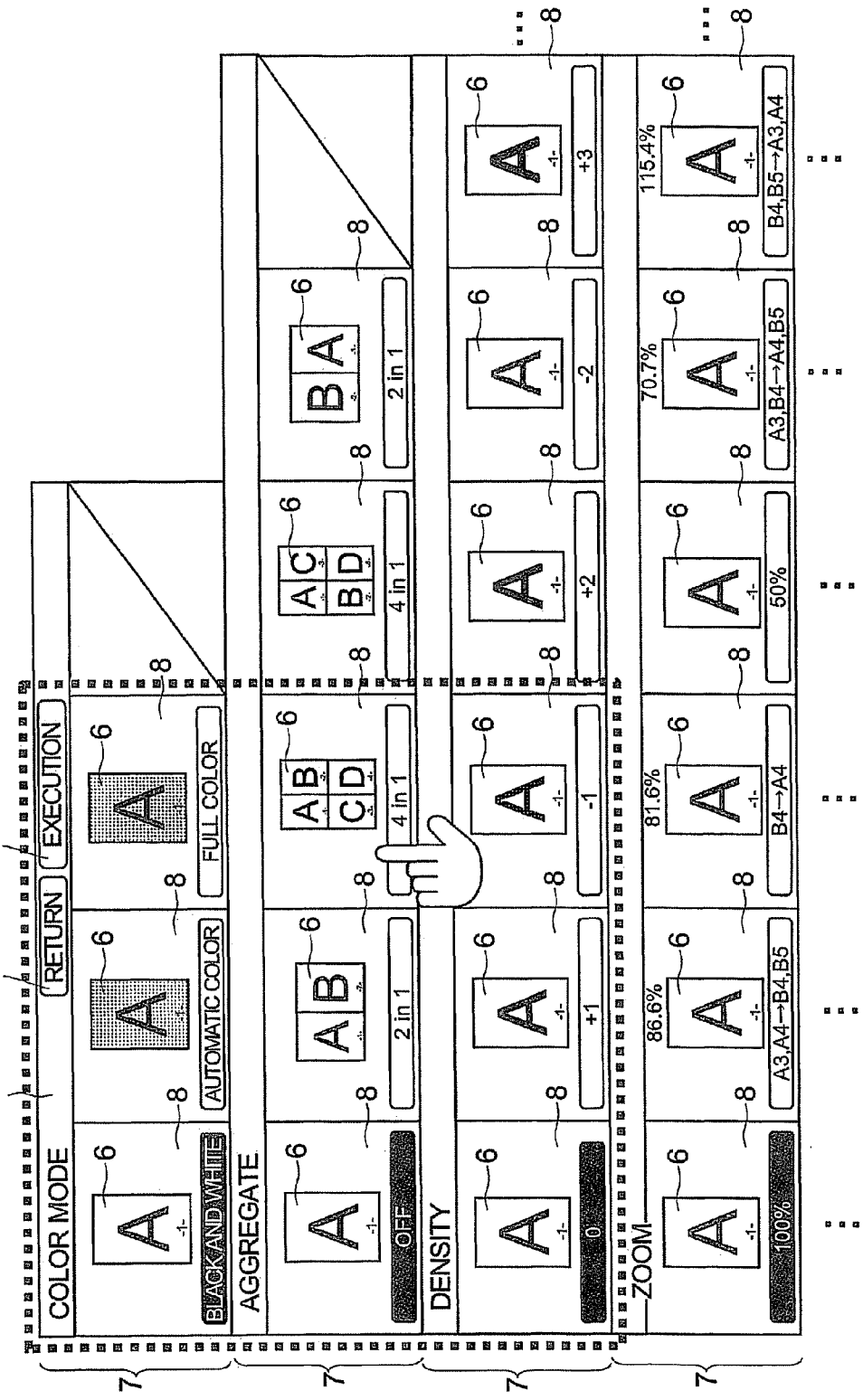
FIG. 8 is a diagram for illustrating a thumbnail display in the display input device of the present embodiment.

The thumbnail display of the preview image in the display input device 1 of the present embodiment will be described with reference to FIG. 8. FIG. 8 is a diagram for illustrating the thumbnail display in the display input device 1 of the present embodiment.

The display input device 1 of the present embodiment has a mode (hereinafter referred to as a "thumbnail display mode") in which a plurality of preview images are displayed as thumbnails. Since the preview image displayed in the thumbnail display mode is smaller than that on the selection screen 5 or the detailed preview screen S2, the preview image displayed in the thumbnail display mode is referred to as a "reduced preview image 6". FIG. 8 shows an example of the reduced preview images 6 displayed in the thumbnail display mode.

When a predetermined operation (mode change operation) is performed, the panel control portion 10 displays, on the display portion 11, the preview images (the reduced preview images 6) in the thumbnail display mode. Specifically, while the all-setting value preview image P1 is being displayed on the operation input portion, when the mode change operation for displaying the preview images (the reduced preview images 6) as thumbnails is performed, the display portion 11 displays setting item regions 7 and setting value input images 8. In this way, only when the all-setting value preview image P1 is checked, and a setting error or a setting omission is found, the mode is changed to the mode in which the thumbnail display is produced, and thus it is possible to change the setting value. In other words, a special operation is required for the display of the setting item regions 7 and the setting value input images 8 (the thumbnail display), and when there is no error or omission in the setting, the setting item regions 7 and the setting value input images 8 are not displayed, with the result that it is possible to simplify the display. The mode change operation can be determined as necessary. The mode change operation in the display input device 1 of the present embodiment is a long-press operation on the display region of the all-setting value preview image P1 in the lower diagram of FIG. 6 and in FIG. 7. Within the selection screen 5 or the detailed preview screen S2, a key for changing to the thumbnail display mode may be displayed.

Since the screen size of the display portion 11 is limited, even when the thumbnail display is produced, the number of images that can be displayed is limited. Hence, in FIG. 8, an area (area of the preview images that are displayed at a time) that is displayed on one screen when the mode is changed to the thumbnail display mode is indicated by thick broken lines. The preview images in FIG. 8 that are not indicated by the thick broken lines are shown as an example of candidates which can be displayed by an operation (details of which will be described later).

In the thumbnail display mode, the panel control portion 10 aligns and displays, on the display portion 11, for a plurality of setting items, the setting item regions 7 including the setting item names. The setting item region 7 refers to a band-shaped region that extends from the left end to the right end of the screen and that has a constant width.

FIG. 8 shows an example where the setting item regions 7 are aligned in a column direction (up/down direction). In the example of FIG. 8, with respect to the order in which the setting items are aligned, the color mode, the aggregate, the density and the zoom are aligned in this order from the top. The number of types of setting item regions 7 that can be displayed is the same as the number of setting items that can be selected on each selection screen 5.

The display portion 11 displays in a state where a plurality of setting value input images 8 are arranged within each of the setting item regions 7. The setting value input image 8 has a block-shaped (rectangular) region. As shown in FIG. 8, in the display input device 1 of the present embodiment, three setting value input images 8 are arranged in the horizontal direction within one screen. In other words, the display portion 11 displays the band-shaped setting item region 7 that extends from the left end to the right end of the screen and that has a constant width, displays the setting value input image 8 as the rectangular region and aligns and displays a plurality of setting value input images 8 in the horizontal direction. In this way, it is possible to produce a display such that for one type of setting item, a plurality of rectangular regions are arranged for each setting value. Hence, within one screen, for one type of setting item, various preview images (reduced preview images 6) can be displayed, and a plurality of preview images are aligned and displayed in an easy-to-understand and easy-to-see manner.

The panel control portion 10 displays, on the display portion 11, one name (character string) among the setting values that can be set by the corresponding setting item within each of the setting value input images 8. The panel control portion 10 displays, on the display portion 11, the reduced preview image 6 that indicates the output result of a job, reflects a setting value the currently set and further reflects (applies or temporarily combines) the attached setting value (character string) within each of the setting value input images 8. In other words, the display portion 11 attaches and displays one name among the setting values within each of the setting value input images 8, and the name is a name of the setting value temporarily combined in the preview image (the reduced preview image 6). Thus, it is possible to easily recognize the setting value reflected (combined) in the preview image. Each preview image and the name of the setting value are visually compared, and thus it is possible to intuitively recognize the effect (the difference of obtained results) of each setting value. In this way, the display portion 11 displays a plurality of preview images (reduced preview images 6) as thumbnails.

In the setting value input image 8 which corresponds to the current setting value (such as "OFF") of each setting item (to which only the current setting value is applied), the panel control portion 10 displays, with a black background, a band-shaped image (bar) within which a character string indicating the setting value. The panel control portion 10 displays different form of setting value input image 8 that the setting value is selected from the form of setting value input image 8 that the setting value is not selected.

The image processing portion 44 (which may be the panel control portion 10) generates, based on the input image data D5, the preview image display data D6 (image data on the reduced preview image 6) for displaying each reduced preview image 6. Specifically, the image processing portion 44 (the panel control portion 10) reflects all the setting values that are set, and performs, on the input image data D5, image processing on which the setting value allocated to the setting value input image 8 is reflected (combined).

Then, the image processing portion 44 (the panel control portion 10) generates the preview image display data for the reduced preview image 6 based on the image data on which the image processing has been performed and an algorithm for generating each reduced preview image 6. The panel control portion 10 displays each reduced preview image 6 on the display portion 11 based on the preview image display data.

Then, the touch panel portion 12 receives an input for selecting the setting value input image 8 (which may be reduced preview image 6) as an input for setting the setting value corresponding to the selected setting value input image 8. Thus, it is possible to change or add the setting value without returning to the selection screen 5 as shown in FIG. 6. In this way, the operation input portion (the touch panel portion 12 and the hard keys 13) receives an act of selecting the preview image (the reduced preview image 6) displayed as a thumbnail as the input for changing or adding the setting value in display. Hence, when a setting omission or a setting error is found in the preview image, it is possible to simply and rapidly change the setting value without a troublesome operation (such as an operation of resetting the setting value or the redisplay of the preview image) for resetting the setting value as conventionally. Since each setting value input image 8 includes the preview image (the reduced preview image 6) indicating the output result of a job when the attached setting value (character string) is further applied, the user can easily recall the output result of a job when the setting value is set. Instead of displaying, as conventionally, only one pattern of the preview images on which all the setting values that are set are reflected, it is possible to align and display the preview images when a setting value is applied separately from the current setting value. Then, the user can easily recall the output result. The user selects only the preview image in the desired form, and thereby can make a setting so as to obtain the desired result without knowing the name and the details of the setting values included in the setting item name and the setting item.

(Order of Display of the Setting Item Regions 7)

The order of display of the setting item regions 7 in the display input device 1 according to the embodiment will then be described with reference to FIGS. 8 and 9. FIG. 9 is a diagram showing an example of the frequency data D3 according to the embodiment.

As described above, a large number of setting items (functions) are prepared for utilization of the individual functions such as copying and transmission. Hence, it is impossible to simultaneously display the setting item regions 7 of all the setting items within one screen so as to have an appropriate size.

Hence, in the display input device 1 of the present embodiment, the order of display of the setting item regions 7 is determined. When the mode is changed to the thumbnail display mode, the panel control portion 10 first displays the top three setting item regions 7 in order of display. In the thumbnail display mode, it is possible to switch the setting item regions 7 to be displayed with a scroll operation (details of which will be described later). As the setting item region 7 is higher in order of display, it can be displayed by a smaller amount of scroll from the screen that is first displayed when the mode is moved to the thumbnail display mode.

Here, in the display input device 1 of the present embodiment, the panel control portion 10 determines the order of display of the setting item regions 7 based on the frequency data D3. The frequency data D3 is stored in the memory 14 (which may be the storage device 42; see FIG. 3).

As shown in FIG. 9, the frequency data D3 is data that indicates either the frequency at which the setting item is selected during the setting operation (regardless of whether or not the seeing is cancelled while the job is executed) or the number of times the setting item is selected while the job is executed. The frequency data D3 includes data indicating the frequency at the setting item is selected for each user (per user). The frequency is, for example, the number of times (in this case, the frequency is a positive integer value). Alternatively, the frequency may be a value obtained by computing the number of times (for example, a value obtained by dividing the number of time by a predetermined value).

The frequency data D3 will be described with reference to FIG. 9. In FIG. 9, for convenience, only the frequencies of part of the setting items in the frequency data D3 are shown, and the other setting items are omitted. The selection frequencies of all the setting items are actually counted. The results obtained by statistically counting the number of times (for example, the number of times the job is executed in the selected state) selection is performed for each setting item are stored in the frequency data D3.

In the example of FIG. 9, the frequency for user A is n1>n2>n3>n4> . . . >nx1. The frequency for user B is n5>n6>n7>n8> . . . >nx2. For the user A, the order of display of the setting item regions 7 is the descending order of frequency (number of times) such as the order of "color mode", "aggregate", "density" and "zoom"; the setting item regions 7 are displayed in the order shown in FIG. 8. In other words, FIG. 8 shows the order of display of the setting item regions 7 when the user A of FIG. 9 changes the mode to the thumbnail display mode.

For the user B, the order of display of the setting item regions 7 is, for example, "aggregate", "color mode", "double-sided printing" and "zoom"; when the mode is changed to the thumbnail display mode. When the mode is changed to the thumbnail display mode, on the first screen, sequentially from above, the setting item regions 7 of "aggregate", "color mode" and "double-sided printing" are displayed.

As described above, the panel control portion 10 displays, in the thumbnail display, based on the frequency data D3 corresponding to the user who has been identified, the setting item regions 7 in descending order of frequency of selection of the setting items by the identified user, on the display portion 11. In this way, the setting item regions 7 can be displayed in descending order of frequency of use of the setting item regions 7. Hence, a display can be produced sequentially from the setting item region 7 of the setting item that is frequently used, and it is possible to preferentially display the setting item region 7 and the setting value input image 8 that are desired by the user to be checked and operated. Furthermore, it is possible to optimize the order of display of the setting item regions 7 according to the user. Hence, it is possible to customize the order of display of the setting item regions 7 for each user such that it is possible to more quickly complete the setting of the setting value. Each time the setting item is selected or each time the job is executed, the panel control portion 10 updates the frequency data D3 of the user who logs in, in the memory 14 or the storage device 42. Consequently, the setting item region 7 corresponding to the setting item used more frequently by the user is likely to be more preferentially displayed.

For the individual setting items, the default order of display is previously determined separately from the frequency data D3. The panel control portion 10 determines, based on the default order of display, the order of display of a plurality of setting items having the same number of times of selection or the order of display of a plurality of setting items that have not been selected.

(Scroll Operation)

Figure 10:
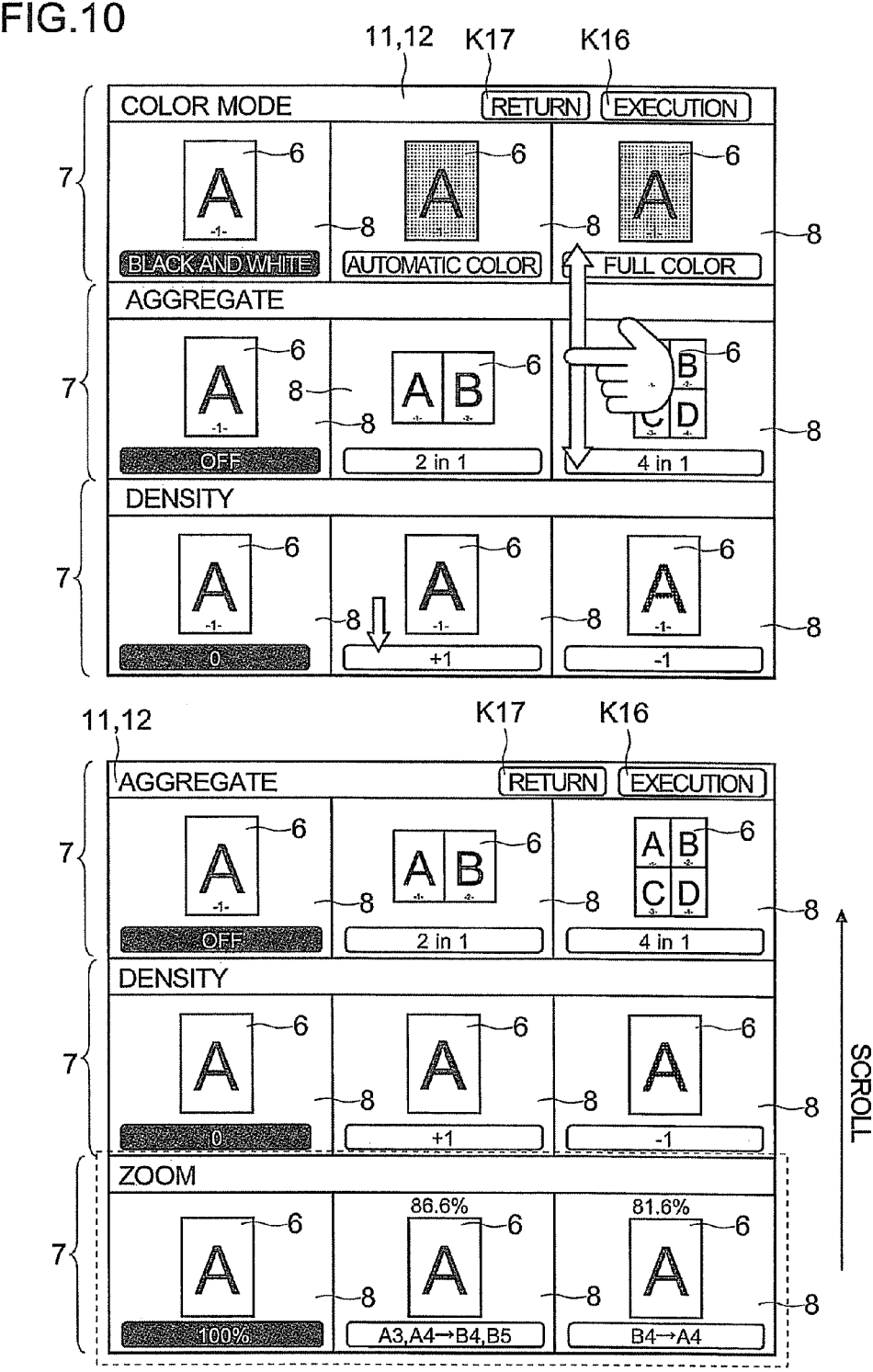
FIG. 10 is a diagram showing a scroll operation for switching setting item regions displayed in the display input device according to the present embodiment.
Figure 11:
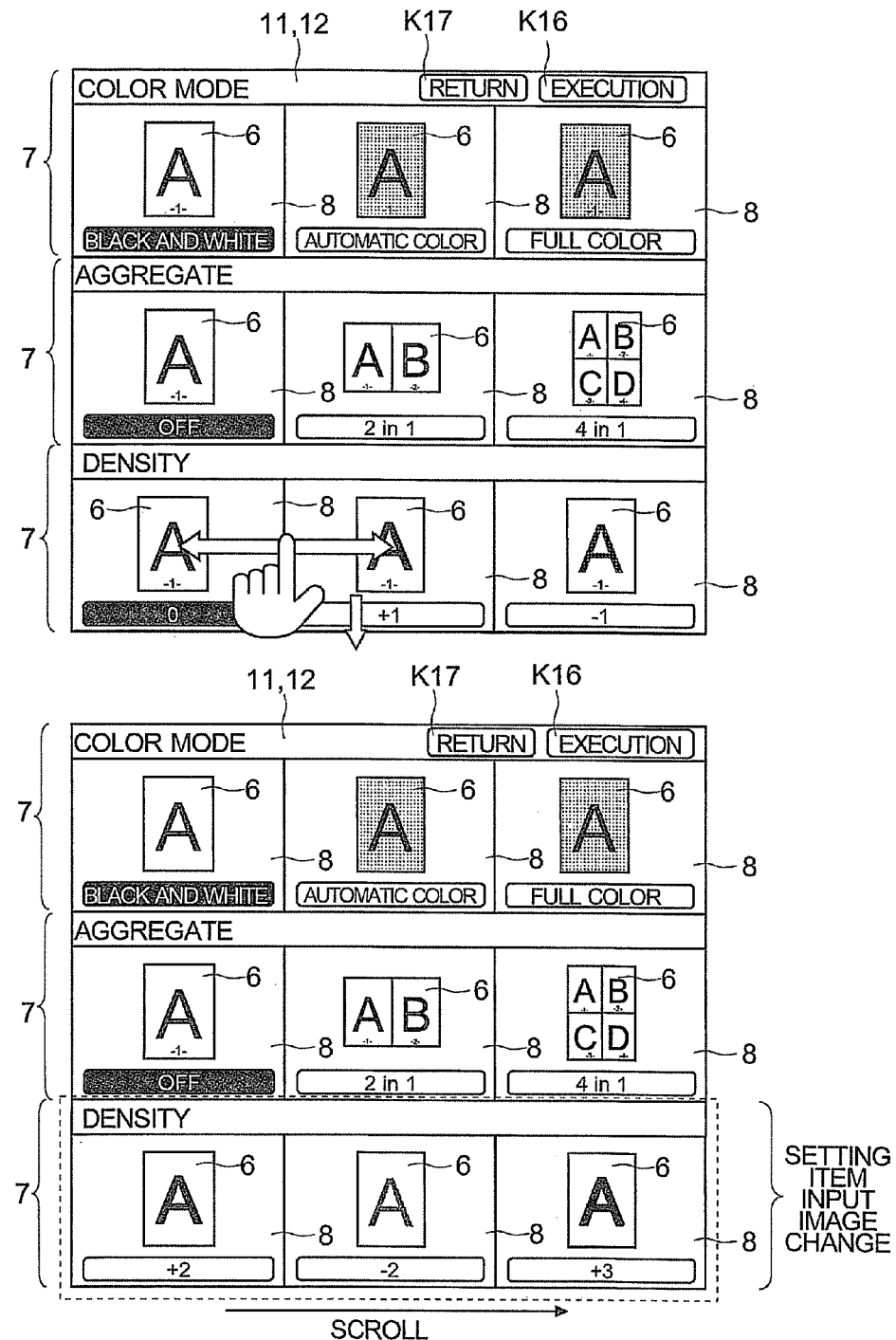
FIG. 11 is a diagram showing a scroll operation for switching setting value input images displayed in the display input device according to the embodiment.

A scroll operation in the display input device 1 of the present embodiment will then be described with reference to FIGS. 10 and 11. FIG. 10 is a diagram showing a scroll operation for switching the setting item regions 7 displayed in the display input device 1 according to the present embodiment. FIG. 11 is a diagram showing a scroll operation for switching the setting value input images 8 displayed in the display input device 1 according to the present embodiment.

In the description of the present embodiment, the scroll operation for switching the setting item regions 7 displayed on the display portion 11 is referred to as a "first scroll operation". The scroll operation for switching the setting value input images 8 displayed within the setting item region 7 is referred to as a "second scroll operation".

The touch panel portion 12 receives the first scroll operation. It is possible to determine, as necessary, what operation is treated as the first scroll operation. In the display input device 1 of the present embodiment, an operation of moving the touch position in the upward direction or in the downward direction while the touch position of the touch panel portion 12 is being touched is treated as the first scroll operation.

Specifically, the panel control portion 10 recognizes the operation of moving the touch position in the downward direction as an operation of switching to the display of the setting item regions 7 that are lower in the order of display. When the first scroll operation is performed, the display portion 11 displays the setting item regions 7 of the setting items that are not displayed. As the distance over which the touch position is moved in the downward direction is longer, the panel control portion 10 displays, on the display portion 11, the setting item regions 7 that are lower. Or the switching speed (scroll speed) of the display of the setting item regions 7 in the lower direction gets faster so that the distance is longer. On the other hand, as the distance over which the touch position is moved in the downward direction is shorter, the panel control portion 10 displays, on the display portion 11, the setting item regions 7 that are closer in the order of display to the setting item regions 7 before the first scroll operation. Or the switching speed (scroll speed) of the display of the setting item regions 7 in the lower direction gets slower so that the distance is shorter. In this way, it is possible to smoothly switch the setting items (the setting item regions 7) to be displayed, with the result that it is possible to easily display the desired setting item.

FIG. 10 shows an example where the setting item region 7 of the "color mode" that is the highest in the order of display is prevented from being displayed by the first scroll operation, the setting item region 7 of "aggregate" and the setting item region 7 of the "density" are moved up by one row and the setting item region 7 of "zoom" that is subsequent in the order of display is newly displayed (see the lower diagram of FIG. 10). In other words, the setting item regions 7 of the setting item of "zoom" and the subsequent setting items that are the setting item regions 7 outside the one screen shown in FIG. 8 are newly displayed by the first scroll operation.

As described above, with the first scroll operation, it is possible to display the setting item region 7 of the desired setting item. Even with the first scroll operation, the relationship of the order of display of the setting item regions 7 remains unchanged (maintained).

On the other hand, the panel control portion 10 recognizes the operation of moving the touch position in the upward direction as an operation of switching to the display of the setting item regions 7 that are higher in the order of display. As the distance over which the touch position is moved in the upward direction is longer, the panel control portion 10 displays, on the display portion 11, the setting item regions 7 that are higher. Or the speed (scroll speed) of the display of the setting item regions 7 in the higher direction gets faster so that the distance is shorter. or the panel control portion 10 increases the speed (scroll speed) of switching to the display of the setting item regions 7 in the higher direction. On the other hand, as the distance over which the touch position is moved in the upward direction is shorter, the panel control portion 10 displays, on the display portion 11, the setting item regions 7 that are closer in the order of display to the setting item regions 7 before the first scroll operation. Or the switching speed (scroll speed) of the display of the setting item regions 7 in the higher direction gets slower so that the distance is shorter.

The touch panel portion 12 receives the second scroll operation. It is possible to determine, as necessary, what operation is treated as the second scroll operation. In the display input device 1 of the present embodiment, an operation of moving the touch position in the leftward direction or in the rightward direction while the touch panel portion 12 within the setting item region 7 whose display is desired to be switched (desired to be scrolled) is being touched is treated as the second scroll operation.

Specifically, the panel control portion 10 recognizes the operation of moving the touch position in the rightward direction while the touch panel portion 12 is being touched as an operation of switching to the display of the setting value input image 8 that is provided on the right side. When the second scroll operation is performed, the display portion 11 displays, by the scroll, the setting value input images 8 corresponding to the setting values that are not displayed. In this way, it is possible to smoothly switch the setting values (the setting value input images 8) to be displayed, with the result that it is possible to easily display the desired setting value input images 8. In each of the setting item regions 7, the order of arrangement of the setting value input images 8 is previously determined. For example, as shown in FIG. 8, in the setting item region 7 of aggregate, sequentially from the left, the following order is previously determined: "OFF", "2 in 1 (left→right arrangement)", "4 in 1 (Z arrangement)", "4 in 1 (N arrangement)" and "2 in 1 (right→left arrangement)".

FIG. 11 shows an example where the second scroll operation is performed on the setting item region 7 of density. In the example, the setting value input image 8 corresponding to "the setting value of +2 (increased by 2 stages)", the setting value input image 8 corresponding to "the setting value of −2 (decreased by 2 stages)" and the setting value input image 8 corresponding to "the setting value of +3 (increased by 3 stages)" that have not been displayed are displayed by the second scroll operation (see the lower diagram of FIG. 11). In other words, the panel control portion 10 newly displays, on the display portion 11, with the second scroll operation, the setting value input images 8 that are not displayed outside the one screen shown in FIG. 8. On the other hand, the panel control portion 10 recognizes the operation of moving the touch position in the leftward direction as the operation of switching to the display of the setting value input image 8 that is provided on the left side (the second scroll operation).

(Interrupt Display Performed by the Setting of the Setting Value)

Figure 12:
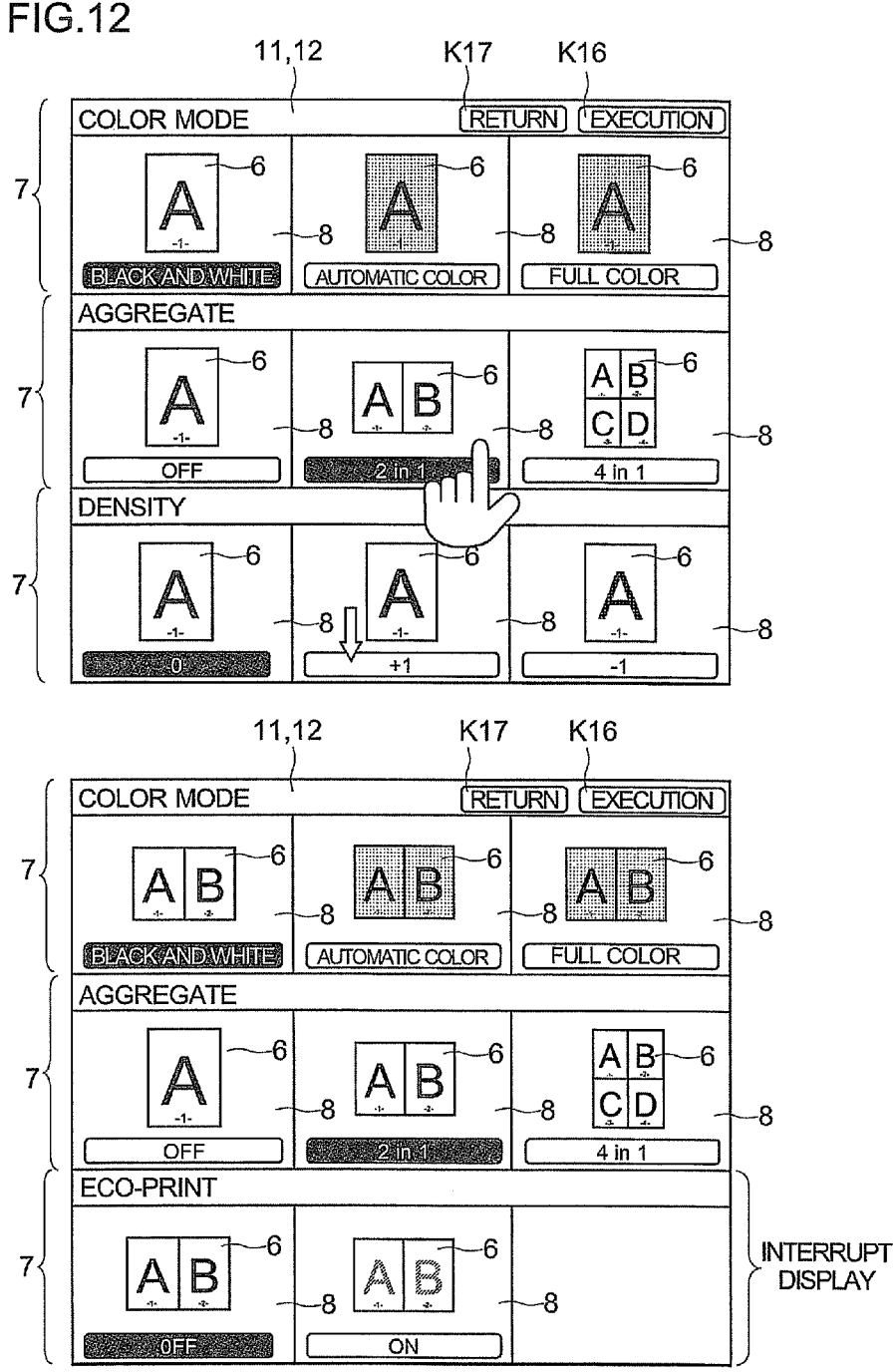
FIG. 12 is a diagram showing an interrupt display performed by the setting of the setting value in the display input device and the switching of reduced preview images.

An interrupt display performed by the setting of the setting value will then be described with reference to FIGS. 12 and 13. FIG. 12 is a diagram showing an interrupt display performed by the setting of the setting value in the display input device 1 and the switching of the reduced preview images 6. FIG. 13 shows an example of the association data D4 according to the embodiment.

As described above, the touch panel portion 12 receives the operation of touching the setting value input image 8 (operation of separating the finger without performing the scroll operation after the touching) as the operation of setting the setting value corresponding to the touched setting value input image 8.

When the setting value is set, regardless of the order of display based on the frequency data D3 (ignoring the order of display based on the frequency data D3), the panel control portion 10 produces, on the display portion 11, an interrupt display of the setting item region 7 of the setting item that is determined to be associated with the setting value that is set (the selected setting value input image 8).

Specifically, the panel control portion 10 displays the setting item region 7 of the setting item that is determined to be associated, adjacently to either the side on or the side under the setting value input image 8 for which the setting value is set. In other words, the interrupt display is to forcefully move up a specific setting item region 7 in the order of display in response to the setting of the setting value (the selection of the setting value input image 8) in the thumbnail display mode.

The association of the setting items is determined by the association data D4. The association data D4 is stored in the memory 14 (which may be the storage device 42). As shown in FIG. 13, in the association data D4, the setting items that are determined to be associated with the various types of setting values (easily set simultaneity, associated with the selected setting value) are defined.

For example, in terms of cost reduction, a setting for reducing the number of sheets printed in aggregate printing such as 2 in 1 or 4 in 1 may be made so that the consumption of toner or sheets is reduced. Hence, when a setting value for 2 in 1 or 4 in 1 is made, in the setting item of "eco-print", a setting value for "eco-print ON (eco-print execution)" may also be set. In other words, "2 in 1" or "4 in 1" and "eco-print ON" may often be combined and set. The eco-print is the function of reducing the amount of toner consumed as compared with normal printing and then performing printing. The density of a printed item is decreased as compared with normal printing.

In the association data D4 shown in FIG. 13, the setting value of 2 in 1 and the setting value of 4 in 1 are defined to be associated with the setting item of the eco-print. On the other hand, in the association data D4 shown in FIG. 13, the setting value of eco-print ON is defined to be associated with the setting item of aggregate.

The lower diagram of FIG. 12 shows an example where when in the thumbnail display mode, the setting value of "2 in 1" is set, the panel control portion 10 produces, on the display portion 11, an interrupt display of the setting item region 7 of "eco-print" that is determined to be associated with the association data D4 shown in FIG. 13.

Results obtained by previously examining the setting items (which may be the setting values) that are combined with the setting values and used are determined as the association data D4. Alternatively, an input for changing the association data D4 is received by the touch panel portion 12 or the hard keys 13, and the panel control portion 10 updates, according to the input for changing the association data D4, the association data D4 in the memory 14 or the storage device 42. In this way, it is possible to produce an interrupt display based on the association data D4 with consideration given to the conditions of use by the user.

For the individual setting values, the setting values (setting values set by the user with the execution of a job) combined and used are previously counted, and when the panel control portion 10 determines that the number of times the setting values are combined and used is equal to or more than a threshold value and that the setting item including the setting value having the largest number of times is the setting item having a high degree of association, an interrupt display may be produced. In this case, for each user, the setting history of the setting values by the user is stored in the memory 14. As described above, when the operation is performed on the setting value input image 8 to set the setting value, the display portion 11 newly produces an interrupt display of the setting item region 7 of the setting item defied to be associated with the setting value selected in the association data D4. In this way, as a response to the setting of the setting value, the setting item region 7 that is highly likely to be combined and set and that has a high degree of association is displayed. Thus, it is possible to smoothly set the setting value and thereby enhance the usability of the display input device 1.

(Switching of the Reduced Preview Images 6)

The switching of the reduced preview images 6 will then be described with reference to FIG. 12.

As described above, the touch panel portion 12 receives, as the operation of touching the setting value input image 8 (operation of separating the finger without performing the scroll operation after the touching) as the operation of setting the setting value corresponding to the touched setting value input image 8. When the setting value is set, the setting value is changed.

Hence, the panel control portion 10 changes the reduced preview image 6 displayed, according to the newly set setting value (changed setting value). In this way, even when the setting of the setting value is repeated, the preview image (reduced preview image 6) of each setting value input image 8 is a preview image which reflects the newly set setting value and which shows an example of the output result of the final job. Hence, it is possible to switch the individual preview images so as to easily recall the output result of the job.

The image processing portion 44 (which may be the panel control portion 10) generates, based on the input image data D5, the preview image display data D6 (the image data on the reduced preview image 6) for displaying each reduced preview image 6. Specifically, the image processing portion 44 (which may be the panel control portion 10) reflects all the setting values after being changed, and performs again, on the input image data D5, the image processing reflecting the setting value allocated to each setting value input image 8.

Then, the image processing portion 44 (the panel control portion 10) newly generates the preview image display data for the reduced preview image 6 based on the image data on which the image processing has been performed and an algorithm (reduction image processing) for generating the reduced preview image 6. The panel control portion 10 displays each reduced preview image 6 on the display portion 11 based on the preview image display data. In this way, before the setting of the setting value and after the setting of the setting value, the reduced preview image 6 other than the setting item region 7 including the newly set setting value is changed.

A specific description will be given with reference to FIG. 12. The upper diagram of FIG. 12 shows that the touch panel portion 12 receives an operation of changing the setting value of the setting item of aggregate from "OFF (no aggregate)" to "2 in 1" (operation on the setting value input image 8 corresponding to "2 in 1").

The lower diagram of FIG. 12 shows that by changing the setting value of the setting item of aggregate to "2 in 1", the individual reduced preview images 6 within the setting item regions 7 adjacent to the setting item region 7 of aggregate (the side on or the side under the setting item region 7 of aggregate) are switched (changed) from the state of no aggregate to the reduced preview image 6 in the state of 2 in 1. The lower diagram of FIG. 12 also shows that the panel control portion 10 determines that there is an association with the setting value of "2 in 1", and that an interrupt display of the setting item region 7 of "eco-print" is produced on the display portion 11.

(Execution of the Job and Completion of the Thumbnail Display Mode)

The start of execution of the job and the completion of the thumbnail display mode in the display input device 1 according to the embodiment will then be described with reference to FIGS. 8 and 10 to 12.

In the thumbnail display mode, the panel control portion 10 displays, on the display portion 11, an execution key K16 for providing an instruction to start the execution of the job reflecting the setting value set within the display screen of the display portion 11. As shown in FIGS. 8 and 10 to 12, in the thumbnail display mode of the display input device 1 of the present embodiment, the execution key K16 is fixedly displayed within the uppermost setting item region 7.

The touch panel portion 12 receives an operation on the display position of the execution key K16. In other words, the operation input portion (the touch panel portion 12 and the hard keys 13) receives an instruction to start the execution of the job in a state where a plurality of setting item regions 7 and a plurality of setting value input images 8 are displayed. In this case, the panel control portion 10 transmits information that the instruction to start the execution of the job is provided to the main control portion 4 and data (signal) indicating the setting value that is set. When the main control portion 4 receives the data, the main control portion 4 performs the job, such as printing or transmission, corresponding to the setting value that is set. In this way, it is possible to provide an instruction to execute the job, without an extra operation, immediately after the recognition of each preview image (reduced preview image 6). When an operation of pressing the start key 131 is performed, the execution of the job may be started.

In the thumbnail display mode, the panel control portion 10 displays, within the display screen of the display portion 11, a return key K17 (thumbnail display mode completion key) for providing an instruction to complete the thumbnail display mode. As shown in FIGS. 8 and 10 to 12, in the thumbnail display mode of the display input device 1 of the present embodiment, the return key K17 is fixedly displayed next to the execution key K16 within the uppermost setting item region 7.

When the touch panel portion 12 receives an operation on the display position of the return key K167, the panel control portion 10 completes the thumbnail display mode and displays, on the display portion 11, the screen before the display of the thumbnail display mode. For example, the panel control portion 10 displays the selection screen 5 or the detailed preview screen S2. In other words, when a predetermined input is performed on the operation input portion (the touch panel portion 12 and the hard keys 13), the display portion 11 displays one sheet of the all-setting value preview image P1 reflecting all the setting values set on the setting value setting screen. After the temporary completion of the thumbnail display mode, on the selection screen 5 or the detailed preview screen S2, the panel control portion 10 displays, on the display portion 11, the all-setting value preview image P1 reflecting the setting value set in the thumbnail display mode.

The image forming apparatus (the multifunctional peripheral 100) according to the embodiment includes the display input device 1 described above. Hence, the multifunctional peripheral 100 according to the embodiment can receive an input for changing or adding the setting value while the preview image (reduced preview image 6) is being displayed. Thus, conventionally, when after the display of the preview image (the preview image reflecting all the setting values), the setting is made again, it is bothersome and time-consuming to perform operations as follows: the interruption of the display of the preview image→ the operation of displaying the setting screen for setting the necessary setting value→ the setting of the setting value→ the redisplay of the preview image. However, since the display input device 1 in which such bothersome operations are not necessary and which is easy to use is included, it is possible to provide the image forming apparatus (the multifunctional peripheral 100) in which it is possible to make the setting easily and rapidly. It is also possible to provide the image forming apparatus (the multifunctional peripheral 100) in which it is possible to simply change the setting value even when the preview image is displayed. It is also possible to provide the image forming apparatus in which it is possible to easily check the effect on the result of a job when the setting value is changed or added, and in which there is no setting error or setting omission.

The present disclosure can be regarded as a method of controlling the display input device.

Although the embodiment of the present disclosure has been described, the scope of the present disclosure is not limited to the embodiment, and various modifications are possible without departing from the spirit of the disclosure. For example, although the example where the setting item regions 7 are aligned in the vertical direction (in the form of a column), and the setting value input images 8 are aligned in the horizontal direction (in the form of a row) has been described, the setting item regions 7 and the setting value input images 8 may be displayed such that the setting item regions 7 are aligned in the horizontal direction (in the form of a row) and the setting value input images 8 are aligned in the vertical direction (in the form of a column).

What is claimed is:

1. A display input device comprising:
   a display portion in which
      for each setting item, a setting item region including a setting item name is displayed, the setting item region being a band-shaped region extending from one to an opposite end of a screen, a plurality of such setting item regions for different setting items being displayed in an array,
      a plurality of rectangular setting value input images are displayed in an array within the setting item region,
      within each setting value input image, one of setting values that can be set for a corresponding setting item is displayed along with a preview image reflecting a currently set setting value and indicating a result of an output of a job when the currently set setting value is combined with the setting value within the setting value input image, and
      a plurality of combinations of one setting value and the preview image are displayed as thumbnails; and
   an operation input portion which receives an operation on the setting value input image as an input for setting the setting value corresponding to the selected setting value input image,
   wherein when the operation input portion receives an input for setting the setting value based on an input for selecting the setting value input image, the display portion changes a plurality of the displayed preview images according to the setting value the is set.

2. The display input device according to claim 1, further comprising:
   a storage portion which stores frequency data indicating a frequency at which the setting item is selected,
   wherein when a thumbnail display is produced, the display portion displays the setting item regions of the setting items in descending order of selection frequency.

3. The display input device according to claim 2,
   wherein the storage portion stores identification data for identifying users and the frequency data indicating, for each of the users, the frequency at which the setting item is selected by the user,
   the operation input portion receives an identification input for identifying the user and
   when the thumbnail display is produced, the display portion displays, based on the frequency data corresponding to the identified user, the setting item regions of the setting items in descending order of the selection frequency of the identified user.

4. The display input device according to claim 2,
   wherein the storage portion stores association data in which the setting item associated with the selected setting value is defined, and
   when an operation is performed on the setting value input image to set the setting value, an interrupt display of the setting item region of the setting item defined to be associated with the selected setting value is newly produced in the association data.

5. The display input device according to claim 1,
   wherein the operation input portion receives a first scroll operation for switching the setting item region displayed on the display portion, and
   when the first scroll operation is performed, the display portion displays the setting item region of the setting item that is not displayed.

6. The display input device according to claim 1,
   wherein the operation input portion receives a second scroll operation for switching the setting value input image displayed within the setting item region, and
   when the second scroll operation is performed, the display portion displays the setting value input image corresponding to the setting value that is not displayed.

7. The display input device according to claim 1,
   wherein the operation input portion receives an instruction to start execution of a job in a state where a plurality of the setting item regions and a plurality of setting value input images are displayed.

8. The display input device according to claim 1,
   wherein when a predetermined input is performed on the operation input portion, the display portion displays one sheet of an all-setting value preview image reflecting all setting values set on a setting value setting screen whereas when a mode change operation for displaying the preview image as the thumbnails is performed on the operation input portion while the all-setting value preview image is displayed, the display portion displays the setting item region and the setting value input image.

9. The display input device according to claim 1,
   wherein the display portion displays the setting item region in a form of a band extending from a left end to a right end of a screen and having a constant width, aligns and displays a plurality of the setting value input images in a horizontal direction and displays the setting value input image as a rectangular region.

10. The display input device according to claim 1,
    wherein the display portion attaches and displays one name of the setting values within each of the setting value input images, and the name is a name of the setting value when the combination is performed in the preview image.

11. An image forming apparatus comprising:
the display input device according to claim 1.

12. A method of controlling a display input device, comprising:
- displaying, for each setting item, a setting item region including a setting item name, the setting item region being a band-shaped region extending from one to an opposite end of a screen, such that a plurality of such setting item regions for different setting items are displayed in an array;
- displaying a plurality of setting value input images in an array within the setting item region;
- displaying, within the setting value input image, one of setting values that can be set for a corresponding setting item along with a preview image reflecting a currently set setting value and indicating a result of an output of a job when the currently set setting value is combined with the setting value within the setting value input image displayed as the character string are combined;
- displaying a plurality of combinations of one setting value and the preview image as thumbnails; and
- receiving an operation on the setting value input image as an input for setting the setting value corresponding to the selected setting value input image,
- wherein when receiving an input for setting the setting value based on an input for selecting the setting value input image, the display portion changes a plurality of the displayed preview images according to the setting value the is set.

* * * * *